United States Patent
Suh et al.

(10) Patent No.: US 10,009,591 B2
(45) Date of Patent: Jun. 26, 2018

(54) DIGITAL BROADCASTING RECEPTION METHOD AND APPARATUS CAPABLE OF DISPLAYING STEREOSCOPIC IMAGES

(71) Applicant: LG ELECTRONICS INC., Seoul (KR)

(72) Inventors: Jongyeul Suh, Seoul (KR); Jeehyun Choe, Seoul (KR); Hotaek Hong, Seoul (KR); Jinpil Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 875 days.

(21) Appl. No.: 14/362,752

(22) PCT Filed: Dec. 4, 2012

(86) PCT No.: PCT/KR2012/010421
§ 371 (c)(1),
(2) Date: Jun. 4, 2014

(87) PCT Pub. No.: WO2013/085245
PCT Pub. Date: Jun. 13, 2013

(65) Prior Publication Data
US 2014/0362181 A1    Dec. 11, 2014

Related U.S. Application Data

(60) Provisional application No. 61/566,683, filed on Dec. 4, 2011, provisional application No. 61/586,824, filed on Jan. 15, 2012.

(51) Int. Cl.
*H04N 13/00* (2018.01)
*H04N 21/2362* (2011.01)
(Continued)

(52) U.S. Cl.
CPC ......... *H04N 13/0048* (2013.01); *H04N 5/455* (2013.01); *H04N 13/0059* (2013.01);
(Continued)

(58) Field of Classification Search
CPC .. H04N 13/0048; H04N 19/597; H04N 5/455; H04N 13/0059; H04N 13/0066; H04N 21/2362
(Continued)

(56) References Cited

U.S. PATENT DOCUMENTS

2007/0171986 A1   7/2007  Hannuksela
2008/0310499 A1   12/2008 Kim et al.
(Continued)

FOREIGN PATENT DOCUMENTS

CN   101175213 A   5/2008
CN   101292538 A   10/2008
(Continued)

OTHER PUBLICATIONS

Description Scheme Group, "MPEG-7 Description Schemes (V0. 5)," International Organisation for Standardisation . . . ISO/IEC JTC1/SC29/WG11, Coding of Moving Pictures and Audio Information, N2844, MPEG 99, Jul. 17, 1999, Vancouver, Canada, XP030011096, pp. 1-59.

*Primary Examiner* — Mishawn Hunter
(74) *Attorney, Agent, or Firm* — Birch, Stewart, Kolasch & Birch, LLP

(57) ABSTRACT

The present invention provides a digital broadcasting reception method, including the steps of: receiving and demultiplexing digital broadcasting signals including reference period and extension period video streams; determining the right/left information of the reference period and extension period video streams by using a descriptor included in at least one of a Program Map Table (PMT), a Terrestrial
(Continued)

Virtual Channel Table (TVCT), a Service Description Table (SDT), and an Event Information Table (EIT); decoding the reference period and extension period video streams; and controlling the decoded reference period and extension period video streams by using the right/left information.

10 Claims, 16 Drawing Sheets

(51) Int. Cl.
*H04N 21/434* (2011.01)
*H04N 21/81* (2011.01)
*H04N 19/597* (2014.01)
*H04N 5/455* (2006.01)

(52) U.S. Cl.
CPC ....... *H04N 13/0066* (2013.01); *H04N 19/597* (2014.11); *H04N 21/2362* (2013.01); *H04N 21/4345* (2013.01); *H04N 21/816* (2013.01)

(58) Field of Classification Search
USPC .......................................................... 348/43
See application file for complete search history.

(56) References Cited

U.S. PATENT DOCUMENTS

| | | |
|---|---|---|
| 2010/0165077 A1 | 7/2010 | Yin et al. |
| 2011/0032999 A1 | 2/2011 | Chen et al. |
| 2011/0063409 A1* | 3/2011 | Hannuksela ......... H04N 19/597 348/42 |
| 2011/0119709 A1* | 5/2011 | Kim ..................... H04N 13/004 725/39 |
| 2011/0234755 A1 | 9/2011 | Suh et al. |
| 2012/0075436 A1* | 3/2012 | Chen ..................... H04N 19/597 348/51 |
| 2014/0118490 A1 | 5/2014 | Suh et al. |

FOREIGN PATENT DOCUMENTS

| | | |
|---|---|---|
| CN | 102265623 A | 11/2011 |
| EP | 2373042 A1 | 10/2011 |
| GB | 2352350 A | 1/2001 |
| KR | 10-2007-0058302 A | 6/2007 |
| KR | 10-2008-0063323 A | 7/2008 |
| KR | 10-2011-0104501 A | 9/2011 |
| KR | 10-2011-0105776 A | 9/2011 |
| WO | WO 2007/047736 A2 | 4/2007 |
| WO | WO 2007/064159 A1 | 6/2007 |

* cited by examiner

FIG. 3

| Syntax | No. of bits | Format |
|---|---|---|
| user_data_registered_itu_t_t35 () { | | |
|     itu_t_t35_country_code | 8 | bslbf |
|     itu_t_t35_provider_code | 16 | bslbf |
|     user_idendifier | 32 | bslbf |
|     user_structure() | | |
| } | | | itu_t_t35_country_code = 0xB5
itu_t_t35_provider_code = 0x0031
user_identifier = 0x4741 3934

| Syntax | No. of bits | Format |
|---|---|---|
| ATSC_user_data () { | | |
|     user_data_type_code | 8 | uimsbf |
|     user_data_type_structure() | | |
| } | | | user_data_type_code = 0x11 view_info_SEI_data ()

FIG. 4

| Syntax | No. of bits | Format |
|---|---|---|
| view_info_SEI_data () { | | |
|     left_view_field | 1 | bslbf |
|     view_ld | 10 | bslbf |
|     reserved | 5 | bslbf |
| } | | |

| Syntax | No. of bits | Format |
|---|---|---|
| view_info_descriptor () { | | |
|     reserved | 3 | bslbf |
|     progam_level | 1 | bslbf |
|     event_level | 1 | bslbf |
|     frame_level | 1 | bslbf |
|     view_info_SEI_included | 1 | bslbf |
|     left_view_flag | 1 | bslbf |
| } | | |

FIG. 12

| nal_unit_type | Content of NAL unit and RBSP syntax structure | C | Annex A NAL unit type class | Annex G and Annex h NAL unit type class |
|---|---|---|---|---|
| 0 | Unspecified | | non-VCL | non-VCL |
| 1 | Coded slice of a non-IDR picture<br>slice_layer_without_partitioning_rbsp() | 2,3,4 | VCL | VCL |
| 2 | Coded slice data partition A<br>slice_data_partition_a_layer_rbsp() | 2 | VCL | not applicable |
| 3 | Coded slice data partition B<br>slice_data_partition_b_layer_rbsp() | 3 | VCL | not applicable |
| 4 | Coded slice data partition C<br>slice_data_partition_c_layer_rbsp() | 4 | VCL | not applicable |
| 5 | Coded slice of an IDR picture<br>slice_layer_without_partitioning_rbsp() | 2,3 | VCL | VCL |
| 6 | Supplemental enhancement information (SEI)<br>sei_rbsp() | 5 | non-VCL | non-VCL |
| 7 | Sequence parameter set<br>seq_parameter_set_rbsp() | 0 | non-VCL | non-VCL |
| 8 | Picture parameter set<br>pic_parameter_set_rbsp() | 1 | non-VCL | non-VCL |
| 9 | Access unit delimiter<br>access_unit_delimiter_rbsp() | 6 | non-VCL | non-VCL |
| 10 | End of sequence<br>end_of_seq_rbsp() | 7 | non-VCL | non-VCL |
| 11 | End of stream<br>end_of_stream_rbsp() | 8 | non-VCL | non-VCL |
| 12 | Filler data<br>filler_data_rbsp() | 9 | non-VCL | non-VCL |
| 13 | Sequence parameter set extension<br>seq_parameter_set_extension_rbsp() | 10 | non-VCL | non-VCL |
| 14 | Prefix NAL unit<br>prefix_nal_unit_rbsp() | 2 | non-VCL | suffix dependent |
| 15 | Subset sequence parameter set<br>subset_seq_parameter_set_rbsp() | 0 | non-VCL | non-VCL |
| 16..18 | Reserved | | non-VCL | non-VCL |
| 19 | Coded slice of an auxiliary coded picture without partitioning<br>slice_layer_without_partitioning_rbsp() | 2,3,4 | non-VCL | non-VCL |
| 20 | Coded slice extension<br>slice_layer_extension_rbsp() | 2,3,4 | non-VCL | VCL |
| 21..23 | Reserved | | non-VCL | non-VCL |
| 24..31 | Unspecified | | non-VCL | non-VCL |

FIG. 14A

1st Access Unit

| AU delimiter (Base view) | SPS (Base view) | PPS (Base view) | SEI message (Base view) | Prefix NAL unit or Subset SPS | Video (Base view) |

⟹ NAL unit processing order

Subsequent Access Units

| AU delimiter (Base view) | PPS (Base view) | SEI message (Base view) | Video (Base view) |

Last Access Unit

| AU delimiter (Base view) | PPS (Base view) | SEI message (Base view) | Video (Base view) | End of sequence |

FIG. 14B

1st Access Unit

| AU delimiter (Dependent view) | Subset sequence parameter set:SPS MVC extension | PPS (Dependent view) | SEI message (Dependent view) | Video (Dependent view) |

⟹ NAL unit processing order

Subsequent Access Units

| AU delimiter (Dependent view) | PPS (Dependent view) | SEI message (Dependent view) | Video (Dependent view) |

Last Access Units

| AU delimiter (Dependent view) | PPS (Dependent view) | SEI message (Dependent view) | Video (Dependent view) | End of sequence |

FIG. 14C

1st Access Unit

| AU delimiter (Dependent view) | Subset sequence parameter set:SPS MVC extension | PPS (Dependent view) | SEI message (Dependent view) | Prefix NAL unit | Video (Dependent view) |

⟹ NAL unit processing order

Subsequent Access Units

| AU delimiter (Dependent view) | PPS (Dependent view) | SEI message (Dependent view) | Prefix NAL unit | Video (Dependent view) |

Last Access Units

| AU delimiter (Dependent view) | PPS (Dependent view) | SEI message (Dependent view) | Prefix NAL unit | Video (Dependent view) | End of sequence |

FIG. 15

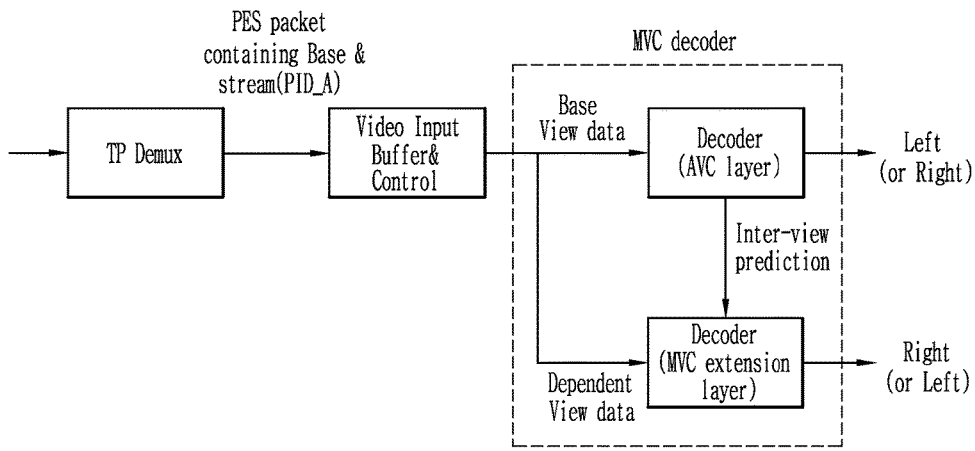

FIG. 16

1 Access Unit

| AU delimiter (Base view) | SPS (Base view) | PPS (Base view) | PPS (Dependent view) | SEI message (Base view) | SEI message (Dependent view) |
|---|---|---|---|---|---|
| Subset sequence parameter set: SPS MVC extension | | Video (Base view) | Prefix NAL unit (Dependent view) | Video(Dependent view): coded slice MVC extension NAL units | |

⟹ NAL unit processing order

Subsequent Access Units

| AU delimiter (Base view) | PPS (Base view) | PPS (Dependent view) | SEI message (Base view) | SEI message (Dependent view) |
|---|---|---|---|---|
| Video (Base view) | | Prefix NAL unit (Dependent view) | Video(Dependent view): coded slice MVC extension NAL units | |

Last Access Units

| AU delimiter (Base view) | PPS (Base view) | PPS (Dependent view) | SEI message (Base view) | SEI message (Dependent view) |
|---|---|---|---|---|
| Video (Base view) | Prefix NAL unit (Dependent view) | Video(Dependent view): coded slice MVC extension NAL units | | End of sequence |

DIGITAL BROADCASTING RECEPTION METHOD AND APPARATUS CAPABLE OF DISPLAYING STEREOSCOPIC IMAGES

CROSS REFERENCE TO RELATED APPLICATIONS

This application is the National Phase of PCT/KR2012/010421 filed on Dec. 4, 2012, which claims priority under 35 U.S.C. 119(e) to U.S. Provisional Application Nos. 61/566,683 filed on Dec. 4, 2011 and 61/586,824 filed on Jan. 15, 2012, all of which are hereby expressly incorporated by reference into the present application.

TECHNICAL FIELD

The present disclosure relates to a digital broadcasting reception method and apparatus, and more particularly, a digital broadcasting reception method and apparatus, capable of allowing a stereoscopic image to be displayed.

BACKGROUND ART

In recent time, with the rising interest in stereoscopic imaging services, apparatuses for providing such stereoscopic images are under development. Methods of displaying such stereoscopic images may include a stereoscopic scheme, a volumetric scheme, a holographic scheme and the like.

A basic principle of the stereoscopic scheme is to separately provides images, which are arranged orthogonal to each other, to user's right and left eyes, and generate a stereoscopic image by combining the images provided to the respective right and left eyes in a brain. Here, the orthogonally-arranged images may become a left view image and a right view image. When the left view image and the right view image are viewed by the left eye and the right eye, respectively, through either polarization glasses or a display device, the user may recognize a stereoscopic image effect.

However, the related art digital broadcasting is provided based on two-dimensional (2D) images. Therefore, in order to effectively implement a stereoscopic imaging service in digital broadcasting, a method of effectively checking and processing a stereoscopic image signal may be taken into account.

SUMMARY OF THE INVENTION

Therefore, to obviate those problems, an aspect of the detailed description is to provide a digital broadcasting reception method, capable of checking and processing a signal for a stereoscopic image, and a digital broadcasting reception apparatus using the same.

Another aspect of the detailed description is to provide a data configuring method and an output control method, for allowing a reception apparatus capable of displaying a stereoscopic (or 3D) image and a reception apparatus capable of displaying only a two-dimensional (2D) image to properly process a signal.

Another aspect of the detailed description is to provide a digital broadcasting transmission and reception method and apparatus, capable of supporting a 3D image display by checking and processing right and left view images on various levels.

Another aspect of the detailed description is to provide related operations of a reception apparatus and further required constraints or regulations, in preparation for 3D broadcasting based on MVC stereo coding.

To achieve these and other advantages and in accordance with the purpose of the present invention, as embodied and broadly described herein, there is provided a digital broadcasting receiving method, including receiving and demultiplexing a digital broadcasting signal including a base view vide stream and an extended view video stream, determining right/left information related to the base view video stream and the extended view video stream, using a descriptor provided in at least one of a program map table (PMT), a terrestrial virtual channel table (TVCT), a service description table (SDT), and an event information table (EIT), decoding the base view video stream and the extended view video stream, and controlling the decoded base view video stream and extended view video stream using the right/left information.

In accordance with one exemplary embodiment disclosed herein, the base view video stream and the extended view video stream may be provided with video stream sections of different view points from each other. The descriptor may indicate the right/left information of the video stream sections of different view points on at least one of a program level, an event level and a frame level. The right/left information on the program level, the event level and the frame level may be processed according to set priorities.

In accordance with another exemplary embodiment disclosed herein, the decoding step may further include determining view point information related to the corresponding stream using a supplemental enhancement information (SEI) message. The base view video stream and the extended view video stream may be provided with the video stream sections of different view points, and the view point information may indicate the view points of the video stream sections using at least one of a frame unit, a picture unit and sequence unit.

To achieve these and other advantages and in accordance with the purpose of the present invention, as embodied and broadly described herein, there is also provided a digital broadcasting reception apparatus, including a tuner that is configured to receive a digital broadcasting signal including a base view video stream and an extended view video stream, a demultiplexer that is configured to demultiplex the base view video stream and the extended view video stream from the digital broadcasting signal, a PSI/PSIP processor that is configured to determine right/left information related to the base view video stream and the extended view video stream, using a descriptor included in at least one of a program map table (PMT), a terrestrial virtual channel table (TVCT), a service description table (SDT), and an event information table (EIT), a decoder that is configured to decode the base view video stream and the extended view video stream, and a 3D video processor that is configured to control the decoded base view video stream and extended view video stream using right/left information.

To achieve these and other advantages and in accordance with the purpose of the present invention, as embodied and broadly described herein, there is also provided a method for receiving digital broadcasting, including extracting a PID value of a received multi-view video codec (MVC) stereo stream and outputting the MVC stereo stream to a decoder, allocating the MVC stereo stream into an AVC layer and an MVC extension layer of the decoder according to a base view and an extended view, and processing access units included in a GOP, by the AVC layer and the MVC extension layer, and decoding base view video data and extended view video data.

In accordance with another exemplary embodiment disclosed herein, the extension view video data may have an NAL type of a coded slice extension or an NAL type of an IDR picture slice or a non-IDR picture slice in a 2-PID multiplex mode.

In accordance with another exemplary embodiment disclosed herein, the dependent view video data may have a different NAL type according to whether or not a prefix NAL unit is present in a 1-PID multiplex mode.

In accordance with the detailed description, information related to stereoscopic image may be provided in various manners, and the stereoscopic image information may be checked and processed. This may allow for outputting the stereoscopic image.

In accordance with the detailed description, a broadcasting receiver may recognize a view point of an image included in a received video stream, so as to control an output of a stereoscopic image.

In accordance with the detailed description, a range of applying view information may be defined according to each level, such that information related to a left view image and a right view image can be provided on each level. Also, the information and accuracy of the corresponding information may be indicated in a descriptor. This may allow a relationship between a video stream and the left and right view images to be set in units of channel/program/service/frame.

BRIEF DESCRIPTION OF THE DRAWINGS

FIG. 3 is a view illustrating a syntax structure of an SEI message including view (point) information metadata in accordance with one exemplary embodiment disclosed herein.

FIG. 4 is a view illustrating a syntax structure of view_info_SEI_data in accordance with one exemplary embodiment disclosed herein.

FIG. 12 is a table showing types of NAL units in MVC coding.

FIG. 14A is a view illustrating one exemplary embodiment of processing a base view stream (PID_A) in an AVC layer.

FIGS. 14B and 14C are views illustrating exemplary embodiments of processing an extended view stream (PID_B) in an MVC extension layer.

FIG. 15 is a view illustrating a reception apparatus in MVC stereo broadcasting of a 1-PID mode.

FIG. 16 is a view illustrating a processing order for each access unit included in GOP in a 1-PID mode.

MODES FOR CARRYING OUT THE PREFERRED EMBODIMENTS

Figure 1:
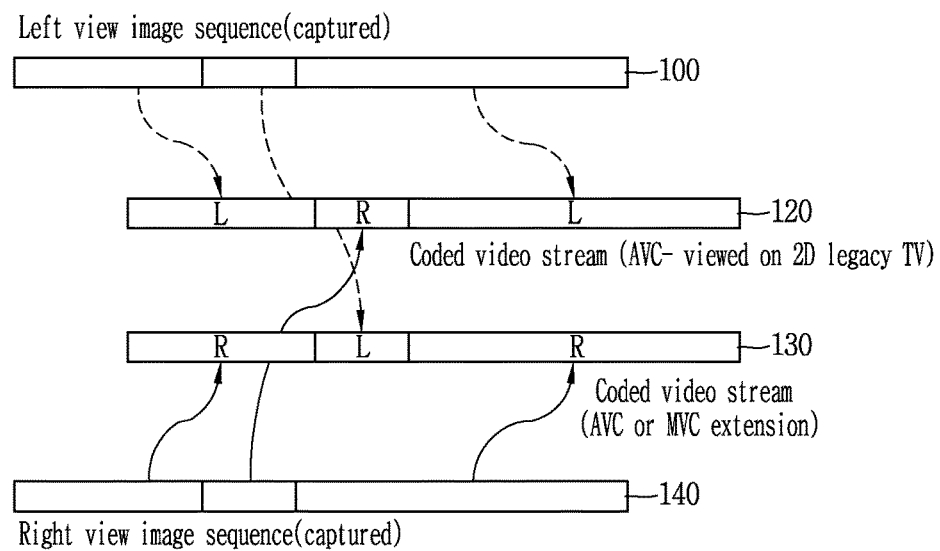
FIG. 1 is a view illustrating a method of transmitting a 3D (content) video stream in accordance with one exemplary embodiment disclosed herein.

The term 3-D or 3D is used to explain a visual representation or display technology for reproducing a stereoscopic image (or a three-dimensional image; hereinafter, referred to as '3D image') providing an optical illusion of depth. With respect to a left view image and a right view image, an observer's visual cortex interprets the two images as one 3D image.

The 3D display technology employs a 3D image processing and displaying technology for a 3D image-displayable device. Optionally, the 3D image-displayable device may require for a specific observation device for effectively providing the 3D image to the observer.

Examples of the 3D image processing and display may include stereoscopic image/video capture, multi-view point image/video capture using plural cameras, processing of 2D image and depth information, and the like. Examples of the 3D image-displayable device may include liquid crystal display (LCD), digital TV screen, computer monitor, and the like, all of which is provided with appropriate hardware and/or software supporting the 3D image display technology. Examples of the specific observation device may include specialized glasses, goggle, headgear, eyewear, and the like.

In detail, the 3D image display technologies may include anaglyph 3D (typically used together with passive red-cyan glasses), polarized 3D (typically used together with passive polarized glasses), alternate-frame sequencing (typically used together with active shutter glasses/headgear), auto-stereoscopic display using a lenticular or barrier screen. Various scopes and features described herein will be applicable to those 3D image display technologies.

Some 3D image display technologies may use rotatable or alternately-operable optical devices, for example, a segmented polarizer attached to a color filter wheel, and in this case, a synchronization therebetween is required. Other 3D image display technologies may use a digital light processor (DLP) based on a digital micro-mirror device (DMD) using rotatable microscopic mirrors, which are arranged in a rectangular form corresponding to pixels of an image to be displayed.

A new type of spec associated with 3D image rendering and displaying technology (specifically, 3D TV) is being developed in various companies, consortiums and organizations, examples of which include the Society of Motion Picture and Television Engineers (SMPTE), Consumer Electronics Association (CEA), 3d@Home consortium, International Telecommunication Union (ITU) and the like. Besides, other standardization groups such as DVB, BDA, ARIB, ATSC, DVD forum, IEC and the like are taking part therein. Moving Picture Experts Group (MPEG) is taking part in 3D image coding of multi-view image, stereoscopic image, and 2D image with depth information. The standardization of a multi-view video codec extension for MPEC-4 advanced video coding (AVC) is currently undergoing. Stereoscopic image coding and stereoscopic distribution formatting relate to color shifting (anaglyph), pixel sub-sampling (side-by-side, checkerboard, quincunx, etc.), and enhanced video coding (2D+delta, 2D+metadata, and 2D with depth information). The scope and features described herein will be applicable to those specs.

Also, at least part of the scope and features of the present disclosure disclosed herein relates to a 3D image display technology which is described in the aspect of an image reproduction and display environment of digital images and 3D TV. However, the details may not be intended to limit various features described herein, and be applicable to various types of other display technologies and apparatuses. For example, the 3D TV technology may be applied to not only TV broadcasting but also Blu-Ray™, console games, cables, IPTV transmission, mobile phones contents transfer, and the like. In this case, the 3D TV may be compatible with other types of TVs, setup box, Blu-ray apparatus (for example, Blu-Ray™ Disk (BD) player), DVD player and TV contents distributor.

Hereinafter, description will be given of a 3D image processing and representing method. Stereoscopic image/video capture is also referred to as a stereo imaging scheme in which two view points are considered. Multi-view image/video capture using plural cameras is referred to as a multi-view imaging scheme in which three or more view points are considered.

The stereo imaging scheme is designed to use one pair of right and left view images, which are obtained by capturing the same target object using left-handed and right-handed cameras. The multi-view imaging scheme is designed to use three or more images, which are obtained by capturing the same target object using three or more cameras spaced apart by a preset distance or angle. The multi-view imaging scheme may display a stereoscopic (3D) image by setting two of the three images to a left view image and a right view image. However, the present disclosure may not be limited to this, but may also implement other types of 3D imaging schemes using three or more images (for example, an integral imaging).

A stereo image or a multi-view image may be compressed and coded according to a variety of methods including a moving picture experts group (MPEG), and then transmitted to a destination. For example, a stereo image or a multi-view image may be compressed and coded according to H.264/advanced video coding (AVC). Here, a reception system may obtain a 3D image by decoding a received image in reverse order of the H.264/AVC.

One of the stereo image or the multi-view image is assigned to an image of a base layer, and the other image assigned to an image of an extended layer (or an extension layer). The image of the base layer is coded in the same manner as a monoscopic imaging. In association with the extended layer image, only information of the relationship between the base layer image and the extended layer image may be encoded and transmitted. An exemplary compression coding method for the image of the base layer may include a JPEG, an MPEG-2, an MPEG-4, an H.264/AVC, and the like. The compression and coding of the extended layer image may be achieved by using H.264/MVC (Multi-view video coding).

When the MVC scheme is additionally applied to the AVC scheme or the right/left image sequences are coded using only the AVC so as to implement the stereoscopic display, one of considerations for broadcasting corresponding 3D content is compatibility with the conventional (or related art) 2D broadcasting reception apparatus (or receiver, hereinafter, referred to as 'reception apparatus'). When one of right and left view images is encoded and transmitted according to a backward-compatible method, the 2D broadcasting reception apparatus recognizes and outputs only the corresponding signal. Accordingly, the corresponding content may be viewable through the 2D reception apparatus.

In one exemplary embodiment of the 3D content transmission, one of view images is encoded into a 2D-compatible signal, such that the 2D-compatible signal is transmitted. Here, a video stream, which is to be transmitted as a 2D image within the same content in consideration of a manufacturer's intention, may be edited into video frames having different view points in respective sections, such that the video frames can be transmitted. Hereinafter, this exemplary embodiment will be described in detail with reference to FIGS. 1A and 1B. FIG. 1A is a view illustrating a method of transmitting 3D (content) video stream in accordance with one exemplary embodiment disclosed herein.

As illustrated in FIG. 1A, a video stream in which a left view video stream section and a right view video stream section are sequentially arranged is an AVC-coded video stream (hereinafter, referred to as a first video stream 120) as a backward-compatible-coded video stream (or a video stream for a 2D broadcasting reception apparatus). Here, the video stream section indicates a video stream section contained in a video stream of different view points, and this section may be configured in units of a video frame, a picture or a sequence. An additional video stream (hereinafter, referred to as a second video stream 130) for a 3D broadcasting reception apparatus (or a receiver, hereinafter, referred to as a reception apparatus) may be coded in an AVC or MVC manner, and transmitted.

Referring to FIG. 1A, a left view image sequence 110 and a right view image sequence 140 are image sequences which are captured and edited at a left view image and a right view image, such that the 3D content is manufactured. In order to implement a display function for the 2D broadcasting reception apparatus, a transmission system selects one of the left and right view image sequences 110 and 140, and codes and transmits the selected one. However, as illustrated, the first and second video streams 120 and 130 acquired by selecting and arranging the left view image and the right view image may be coded and transmitted.

In this case, the 2D broadcasting reception apparatus receives, decodes and outputs the first video stream 120. However, if the 3D broadcasting reception apparatus receives the first video stream 120 and the second video stream 130 and output them without any change, there may arise an unexpected section in which the left view image and the right view image are replaced with each other. That is, as illustrated, when a view point is changed within the coded video stream, the 3D image may not be normally output unless the 3D output is correctly controlled in response to a corresponding view point. Also, since an accurate control of the 3D output is enabled, it may be possible to continuously output only one of the left view image and the right view image even in the 2D broadcasting reception apparatus.

The problems may also be present on a channel/program/event level, for example.

As illustrated in FIG. 1B, when events are processed in the order of first to third events, there may arise a case where the first video stream 120 is the left view image in the first event but the right view image in the second event according to a manufacturer's intention. In this case, the second video stream 130 is the right view image in the first event and the left view image in the second event. In this manner, if a means for accurately controlling the 3D output according to a corresponding view point within a coded video stream is provided even on the event level, a signal in which a right view and a left view are replaced with each other may be processed.

The present disclosure proposes a signal processing method for accurately controlling a 3D output according to a view point. Hereinafter, description will be given of configuration and processing of video information metadata as signaling data for informing a view point of a corresponding image in units of a picture, a frame or a sequence with respect to a coded image sequence, and configuration and processing of a descriptor for informing a view point in units of channel/program/event.

First of all, description will be given of one exemplary embodiment disclosed herein of a method for including view information data in a video elementary stream (ES) and transmitting the resultant video ES.

In case of using H.264 (or AVC) video data and MVC extension video data, a video ES may include a supplemental enhancement information (SEI) message. The SEI message indicates additional information, which is unnecessary during a decoding process. The SEI message may include timing information related to each picture in association with hypothetical reference decoder (HRD), information related to a pen/scan function (a function of reading and displaying some parts of the decoded image), information required for executing random access, information individually defined by a user, and the like.

Figure 2:
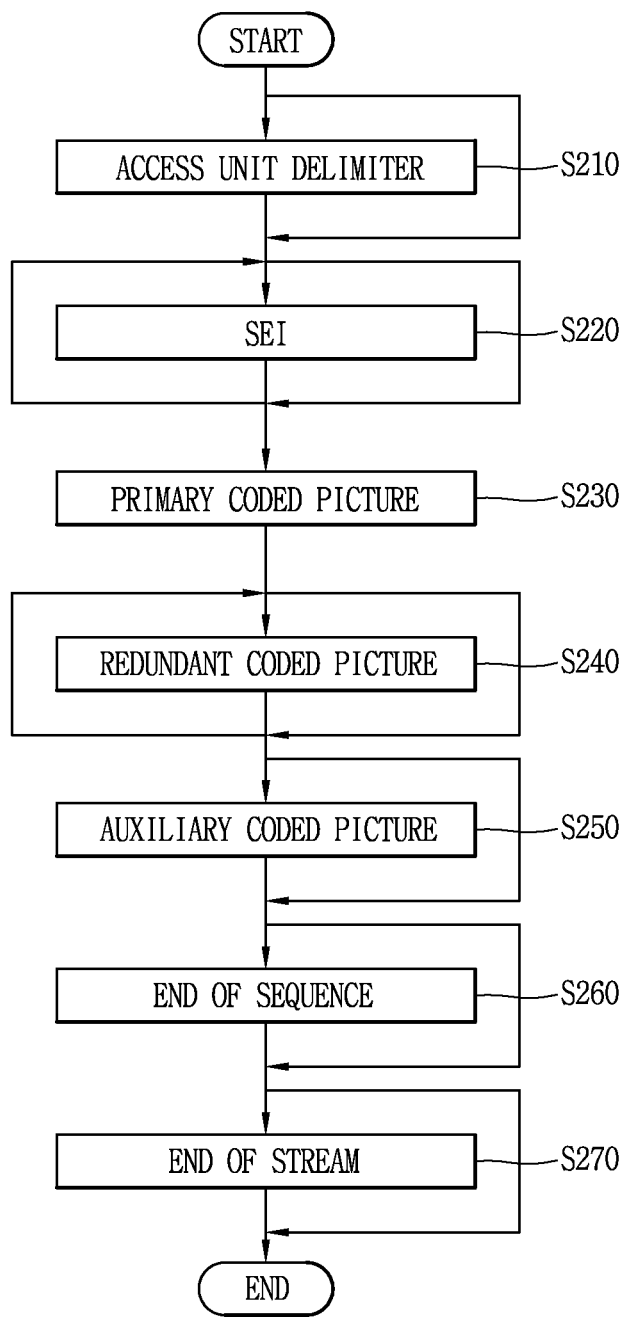
FIG. 2 is a flowchart illustrating sequential steps of processing a video stream including a supplemental enhancement information (SEI) message in accordance with one exemplary embodiment disclosed herein.

FIG. 2 is a flowchart illustrating the order of processing a video stream including an SEI message in accordance with one exemplary embodiment disclosed herein, and FIG. 3 is a view illustrating a syntax structure of an SEI message including view (point) information metadata in accordance with one exemplary embodiment disclosed herein.

A method of processing an access unit in the processing order of the video stream illustrated in the drawing will be described as follows.

First, whether or not an access unit delimiter network abstraction layer (NAL) unit is present may be checked (S210). If present, it may be a first NAL unit.

When the SEI NAL units are present (S220), they may precede a primary coded picture (S230). Also, when there is a SEI NAL unit including a buffering period SEI message, the buffering period SEI message may be a first SEI message payload of the first SEI NAL unit within the access unit.

The primary coded picture may precede corresponding redundant coded pictures. When the redundant coded pictures are present (S240), they may be arranged in an ascending order of the value of redundant_pic_cnt.

When a sequence parameter set (SPS) extension NAL unit is present, it may be an NAL unit subsequent to an SPS NAL unit which has the same value as the value of seq_parameter_set_id within the SPS extension NAL unit.

When there is one or more coded slices of an auxiliary coded picture without partitioning NAL units (S250), they may follow the primary coded picture and all redundant coded pictures.

When an end of sequence of the sequence NAL unit is present (S260), it may follow the primary coded picture and all redundant coded pictures, or follow all coded slices of the auxiliary coded picture without partitioning NAL units. When an end of stream of a stream NAL unit is present (S270), it may be the last NAL unit.

According to the order that the video decoder processes the SEI message within the video stream, the transmission system may include video branching data, for example, view information metadata in an SEI area of the video ES and transmit the video ES, so as to inform a view point of the corresponding image in units of a picture, a frame or a sequence. This may result in implementing the transmission through video level metadata.

For H.264 (or AVC) and MVC extension video data, the transmission system may transmit additional information by including it in an SEI area. In FIG. 3, the transmission system may transmit additional information required for a broadcasting application using user_ identifier and user_ structure included in user_data_registered_itu_t_t35( ), in which an SEI payloadType value is set to 4 in the SEI message.

ATSC_user_data may be located within the user_structure, and the transmission system may recognize that the corresponding data is view_info_SEI_data by referring to a user_data_type_code field. A reception apparatus may recognize which one of views is contained in a corresponding picture using a view branching data syntax included in the user_data_type_structure, for example, fields included in the view_info_SEI_data.

FIG. 4 is a view illustrating a syntax structure of view_info_SEI_data in accordance with one exemplary embodiment disclosed herein. Hereinafter, each field configuring the view_info_SEI_data illustrated in FIG. 4 will be described. For brief description, English terms of fields configuring a syntax will be used as they are and distinguished using double quotes.

"left_view_flag" is a field indicating whether a picture including the SEI message (or a picture received immediately after the SEI message) is either a left view image or a right view image. The picture may be the left view image if "left_view_flag" is set to '1,' and the right view image if "left_view_flag" is set to '0.'

"view_id" is a field indicating a corresponding view ID to which the SEI message is applied, and uses the same value as the value of view_id set in picture parameter set (PPS) or sequence parameter set (SPS) of MVC. That is, this field may be used to recognize to which view point of the MVC stream the content of the SEI message is applied. In other words, the view_id informs of numbers which matches the left view image and the right view image (hereinafter, view information described herein indicates information related to right/left view images, unless explained separately, and is distinguished over view_id information.

Here, the present disclosure may not be limited to the syntax. For example, the view_id field may be omitted. When the view_id field is omitted, an embodiment may be allowed in which the left_view_flag value set in the view_info_SEI_data is unconditionally set for a base view component. In this case, when the base view is the left view image, the corresponding view may be set to the right view image. On the contrary, when the base view is the right view image, the corresponding view may be set to the left view image.

Also, a method of transmitting view information metadata may be made available in various exemplary embodiments disclosed herebelow.

In one exemplary embodiment, view information metadata may be transmitted at a position of an instantaneous decoding refresh (IDR) picture indicating the head picture of an image sequence. In association with the IDR picture, because H.264/AVC scheme generally allows an inter-frame prediction indicating that a P picture located behind an I picture refers to other picture located in front of the I picture, it is difficult to fully initialize a state merely using a general I picture, such that the IDR picture is used to solve the problem.

In another exemplary embodiment, the view information metadata may be transmitted at every picture position. Or, the view information metadata may be transmitted at a start position of each sequence. In this case, information related to previous view information metadata may be maintained until new view information metadata is received. As another exemplary embodiment, the view information metadata may be transmitted at each picture position, and a corresponding value may be kept at the same value within one sequence. That is, if one view point is selected in a specific section for a 2D video sequence, a video sequence may be coded such that the same view point is maintained in one sequence.

Also, when video data is transmitted as a plurality of streams, the view information metadata may basically be transmitted by being included in a base view video stream. Also, even for processing an extended view (an extension view or a dependent view) video stream, it may be possible to use information related to a view point included in the base view video stream may be used. For example, for a stereoscopic video stream, a view point of the extended view video stream may be opposite to the view point of the base view video stream. Accordingly, information related to a view point included in the base view video stream may be used even in the case of processing the extended view video stream. As another example, the base view video stream may also be transmitted by including even the information related to the view point of the extended view video stream. Also, the view information metadata may be transmitted by being included in the extended view video stream or in both of the base and dependent video stream.

Also, stereoscopic video data may be transmitted as one stream in a manner that right and left view points are mixed in one frame. Representative examples may include side-by-side, top-bottom, checkerboard, horizontally/vertically interleaved formats, and the like. Even in this case, view SEI data can be transmitted. Upon an output in a 2D mode, a 2D sequence may be reconstructed (reconfigured) using right and left view images based on the view SEI data information and displayed. Here, a distinguishing method using the view_id field may be used for the top-and-bottom format. For example, it may be top if view_id='0' and bottom if view_id='1.'

In accordance with one exemplary embodiment disclosed herein, the view information metadata may be transmitted by being constructed as a separate packetized elementary stream (PES) packet. That is, instead of including the view information metadata in the video stream as described above, the transmission system, as aforementioned, may construct the view information metadata as a separate independent PES packet except for a video stream and an audio stream.

The foregoing description has been given of the configuration (construction) and processing of the view information metadata as the signaling data for informing the view point of the coded image sequence in units of picture, frame or sequence.

Such method may extend to a syntax which informs of a view point in units of channel/program/event. That is, ranges for applying view point information may be defined for each level, such that information related to right and left view images can be provided on each level. In one example, a method of including a new descriptor in a program map table (PMT) of program specific information (PSI) and signaling the descriptor may be employed. However, the present disclosure may not be limited to this. The descriptor may be provided in table information, such as an event information table (EIT), a terrestrial virtual channel table (TVCT), a service description table (SDT) and the like.

Figures 5, 6:
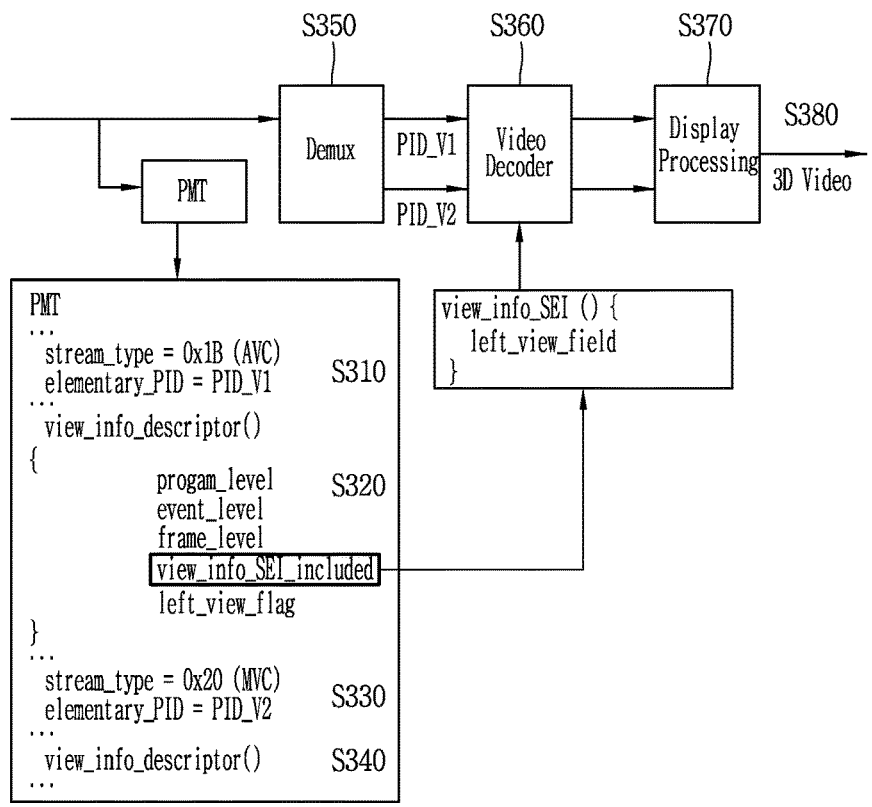
FIG. 5 is a view illustrating a syntax structure of view_info_descriptor.
FIG. 6 is a conceptual view illustrating a process of parsing signaling data.

As a syntax structure of such descriptor, FIG. 5 illustrates a syntax structure of view_info_descriptor.

As illustrated in FIG. 5, view_info_descriptor may include elements which indicate information related to view information and accuracy of the corresponding information.

"program_level" is a field indicating up to which level is valid for view information related to a corresponding video stream included in left_view_flag. When the program_level field is set to '1,' it indicates that the view information included in the left_view_flag is fixed in units of channel/program/service, irrespective of values of other fields. That is, the "program_level" field indicates whether or not the view information is changed on a program level.

"event_level" is a field indicating up to which level is valid for view information related to a corresponding video stream included in left_view_flag. When the event_level field is set to '1' (here, the program_level field is set to '0'), it indicates that the view information included in the left_view_flag is changed in an event unit, and whether or not the view information is changed within an event may be signaled by a combination with a "frame_level" field.

"frame_level" is a field indicating up to which level is valid for view information related to a corresponding video stream included in left_view_flag. When the frame_level field is set to '1' (here, the program_level field and the event_level field are set to '0'), it indicates that the view information included in the left_view_flag may be changed in a frame unit, and details thereof will be understood by referring to the following Table 1.

TABLE 1

| event_level | frame_level | Description |
| --- | --- | --- |
| 0 | 0 | Right/left information of a corresponding video does not change neither in a frame unit nor in an event unit (Here, program_level should be '1' (program_level = '1'). |
| 0 | 1 | Right/left information of a corresponding video changes in a frame unit. |
| 1 | 0 | Right/left information of a corresponding video changes in an event unit, and a view point which is changed corresponds to an event boundary. |
| 1 | 1 | Right/left information of a corresponding video changes in an event unit, but the change of the right/left information may be happened even in the same event (e.g., generation of a segment, such as an intermediate advertisement, within a time set in the same event_id). |

When "view_info_SEI_included" is set to '1,' it indicates that an SEI message including view information related to a corresponding video stream is present in the video. Here, the value of left_view_flag included in the view_info_descriptor cannot reflect actual view information. Therefore, if the vide_info_SEI_included field is used, the view information can be checked on a video level.

"left_view_flag" is a field indicating view information related to a corresponding video stream on a program or event level. If a value of this field is set to '1,' it indicates that the corresponding video stream is a left view image of 3D, and if it is set to '0,' it indicates that the corresponding video stream is a right view image of the 3D.

If the signaling method for informing the view point of the corresponding image in units of picture, frame or sequence is combined with the signaling method for informing the view point in units of channel/program/event, right/left information related to the corresponding image can be checked in most of cases. Hereinafter, a processing method of the embodiment will be described.

Figure 7:
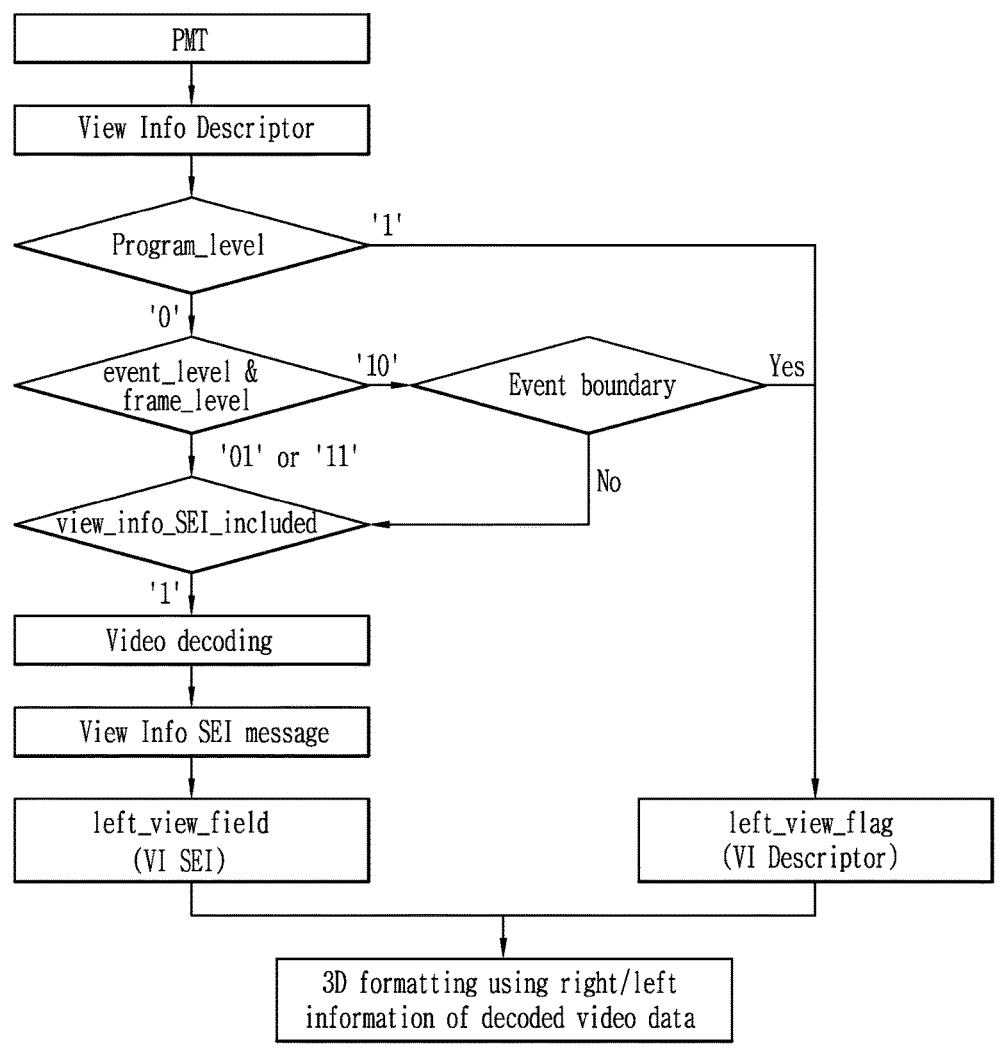
FIG. 7 is a flowchart illustrating a process of acquiring view (point) information using the method of FIG. 6.

FIG. 6 is a conceptual view illustrating a process of parsing signaling data, which illustrates a method of providing right and left view image information using a program map table (PMP) of a program specific information (PSI) and an SEI message of a video stream, and FIG. 7 is a flowchart illustrating a process of acquiring view information using the method of FIG. 6.

"view_info_SEI" is included in a video stream, and "view_info_descriptor" is provided in the PMT.

Hereinafter, fields included in the PMT will be described. "stream-type" is a field indicating a type of elementary stream. The stream_type field has a value of '0x1B' when a base view video stream is coded by AVC, and has a value of '0x20' when an extended view video stream is coded by MVC, so as to inform whether the video stream is a base image or an additional image (or a dependent image) of an elementary stream. Also, "elementary PID" provides a PID value of a stream packet.

Hereinafter, a process of parsing signaling data in the thusly-defined structure will be described.

First, a PID value (PID_V1) with respect to a base image (AVC) may be recognized in PMT (S310). Next, right/left information related to the corresponding image may be recognized based on view_info_descriptor for the base image (AVC, PID value=PID_V1) (S320). The step S320 may be omitted and be replaced by the following step S340.

Also, a PID value (PID_V2) with respect to a dependent image (MVC) may be recognized in PMT (S330). Right/left information related to the corresponding image may be recognized based on the view_info_descriptor for the dependent image (MVC, PID value=PID_V2) (S340). The step S340 may be omitted and be replaced by the step S320.

When the right/left information related to the corresponding image is recognized, a transport packet having the PID values (PID_V1, PID_V2) corresponding to the base image and the dependent image is input into a video decoder (S350), and the base image and the dependent image are decoded (S360) (In the step S360, the right/left information related to the video stream is recognized using the view_info_SEI included in the corresponding stream).

The recognition of the right/left information will be described with reference to FIG. 7. If the program_level value is set to '1,' whether the corresponding image is either a left view image or a right view image may be decided based on the left_view_flag of the view_info_descriptor.

If program_level='0,' event_level='1,' and frame_level='0,' whether or not the corresponding image is the left view image and the right view image may be decided based on the left_view_flag of the view_info_descriptor. However, a problem may occur in the operation of the reception apparatus since an event boundary which is signaled by EIT is not aligned with an actual event boundary during an actual broadcasting process. In this case, whether the corresponding image is either the left view image or the right view image may be decided by checking the left_view_ field of the view_info_SEI message.

If program_level='0' and frame_level='1,' whether the corresponding image is either the left view image or the right view image is decided always by checking the left_view_ field of the view_info_SEI message, irrespective of the value of event_level.

Referring back to FIG. 6 together with FIG. 7, a display processor may carry out post processing (de-interlacing, frame rate converting, etc.) with respect to the base image and the additional image (S370), and output a 3D video by mapping a right/left image using the view_info_descriptor or the view_info_SEI_message (S380).

Figure 8:
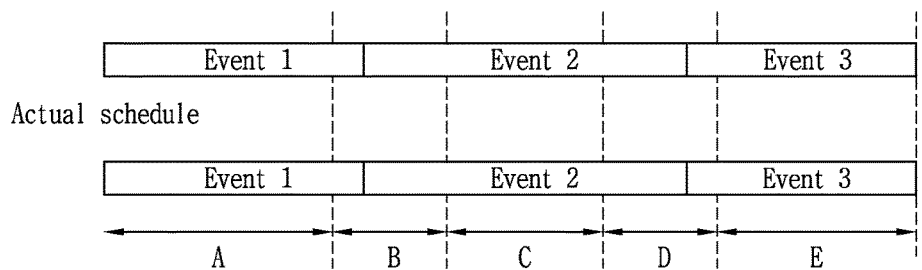
FIG. 8 is a view illustrating various exemplary embodiments of view switching.

Such reception control method may allow for various types of view switching. FIG. 8 is a view illustrating various exemplary embodiments of view switching.

Case 1 corresponds to a case of 'program_level='1,' event_level='0,' and frame_level='0.' In Case 1, the right and left view images are fixed in each video stream. Therefore, the program_level of the view_info_descriptor has a value of '1' in the range of sections A~E, and the right/left information related to each video stream is recognized by using the value of left_view_flag included in the view_info_descriptor.

Case 2 corresponds to a case of program_level='0,' event_level='1,' and frame_level='0.' In Case 2, the right and left view images may be switched on an event level.

View (point) information may be changed in an event unit, and maintained within one event. However, a problem may occur in an operation of the reception apparatus because an event boundary which is signaled by EIT is not aligned with an actual event boundary during an actual broadcasting process. For example, a section B should be a time section in which Event 2 is broadcasted by EIT but actually corresponds to a section in which Event 1 is broadcasted. If a difference of view information is present between Event 1 and Event 2, a point (time or time point) to which view information related to Event 2 is applied is a point (time or time point) at which a section C starts. However, it is unable to inform an accurate switching time point of a view point on a frame level only by using the VI descriptor (view information descriptor) of the PMT or the VI descriptor of the EIT.

Therefore, the following signaling may be carried out in each section unit.

Sections A, C and E: These are sections in which Event 1 is carried out in response to the signaling from the EIT. In these sections, information indicating whether each video component is a left view image or a right view image is recognized using the view_info_descriptor of the PMT or the view_info_descriptor of the Eli. In this case, the view_info_descriptor may have setting of program_level='0,' event level='1,' and frame_level='0.'

Sections B and D: These are sections in which a signaled content of the EIT and an actually broadcasted content are different or likely to be different from each other. The following signaling is carried out in these sections.

Each field in the view_info_descriptor has settings of program_level='0', event_level='1', frame_level='1', and view_info_SEI_included='1', and a view info SEI is always transmitted within a video stream. Also, right/left view image information is signaled using left_view_field. This exemplary embodiment may include a time point that a start or end time of an event signaled by the EIT is close at hand or a case where the EIT and an actually broadcasted content are different.

Case 3 is a case of program_level='0', event_level='0', and frame_level='1'. In Case 3, right and left view images are switched on a frame level. Hence, the right and left view images are mapped using a view_info_SEI message. Also, view_info_SEI_included of the view_info_descriptor is set to '1' and view info SEI is surely transmitted. Also, right/left view image information is signaled using left_view_field.

Case 4 is a case of program_level='0', event_level='1', and frame_level='1'. In Case 4, right and left view images are switched on an event level. It is also possible that the images are switched on a frame level.

In this case, view information may be fixed for a significant dominant portion of an event. That is, specific right/left view image information is maintained for most of a period of an event, but the right and left view images are switched in an intermediate advertisement or in some other segments. A case where the right and left view images are switched in a scene unit may also be included. Hereinafter, Case 4 will be described in more detail with reference to FIG. 9.

Figure 9:
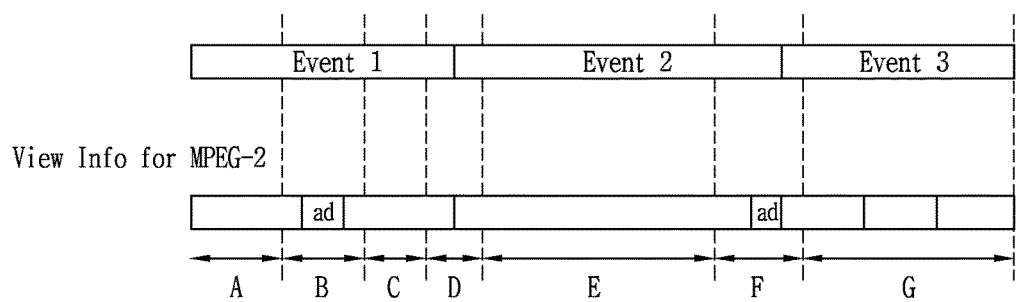
FIG. 9 is a conceptual view illustrating a signaling proposal for an event boundary detection.

FIG. 9 is a conceptual view illustrating a signaling proposal for event boundary detection.

As illustrated in FIG. 9, view information is changed in a portion of an intermediate advertisement in Event 1. Event 2 includes an advertisement at the last portion of the event, and the view information is changed at the last portion. In addition, view information is changed any time within an event in Event 3.

Here, in sections A, C and E, view information which represents a corresponding event may be signaled on an EIT or PMT level, and this information may be utilized as view information of the corresponding sections. Therefore, the following signaling may be executable.

Sections A, C and E: These sections have settings of eventlevel='1' and frame_level='0'. View information related to the corresponding sections is signaled using the left_view_flag field of the view_info_descriptor.

Sections B, D and F: These sections have settings of event_level='1' and frame_level='1'. These sections include some sections (B and F) having an invalid portion of view information of an event level or a section (D) where an event boundary is present. Therefore, the view info SEI message should be transmitted within the corresponding sections through a video stream. Therefore, the view_info_SEI_included of the view_info_descriptor is set to '1' and view information is signaled using the left_view_field of the view info SEI message.

Section G: This section has settings of eventlevel='0', frame_level='1', and view_info_SEI_included='1'. In this section, view information which may represent an event is not present and the view information irregularly changes. Therefore, the view info SEI message is always transmitted and view information is signaled using the left_view_field.

In addition to the aforementioned, the present disclosure may also propose various types of standards. For example, when the program-level, the event_level and the frame-level are signaled in a different manner from those defined in the previous embodiments (for example, if the three fields are all set to '1'), the levels may have priorities in the order of frame_level>event_level>program_level. Hence, when the three fields are all set to '1', the reception apparatus may preferentially carry out an operation for signaling with respect to frame_level='1', and eventually recognize and process right/left information of a corresponding frame on a video level in a frame unit.

The program_level field may be omitted in some cases. That is, when the event_level and the frame_level are all set to '0', it may be determined that view information related to a corresponding service/channel is fixed.

Also, when the view_information_descriptor is present in both PMT and EIT, priorities thereof may be set. For example, that the view_information_descriptor is located in the EIT is intended to recognize information related to a corresponding event in advance. Correct view information may actually be recognized based on the view info SEI message of PMT and a video level. Therefore, when the view_information_descriptor of EIT and the view_information_descriptor of PMT are different from each other in contents therein, the view_information_descriptor of PMT is preferentially processed.

Also, the view info SEI message may be signaled only with respect to a base view (or a base view image), if possible. It may also be possible to implement an embodiment in which when the view info SEI message is signaled with respect to both the base view and an extended view (or a dependent view image), if such conflict occurs, the view info SEI message with respect to the base view is preferentially processed.

Figure 10:
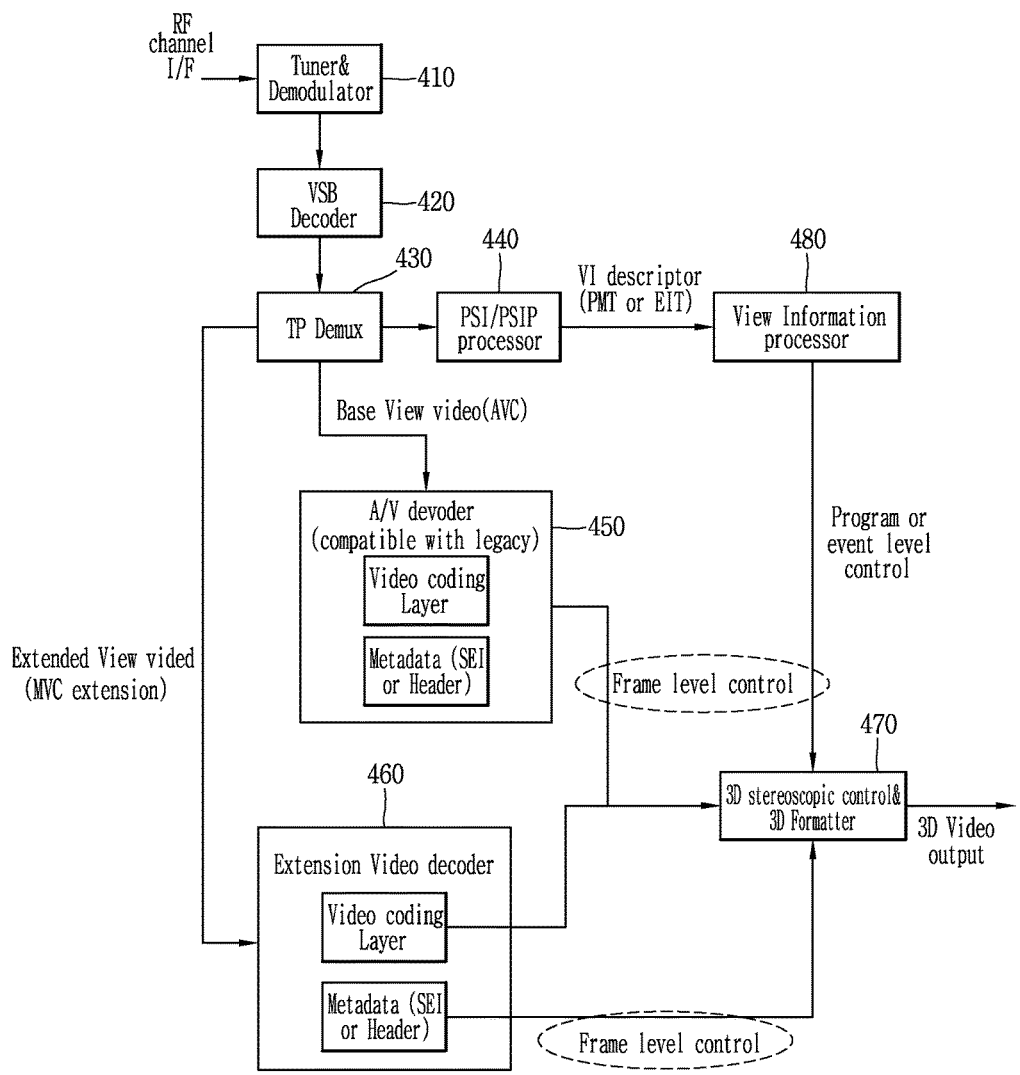
FIG. 10 is a view illustrating a structure of a reception apparatus for controlling a 3D output of a decoded picture using view point information.
Figure 11:
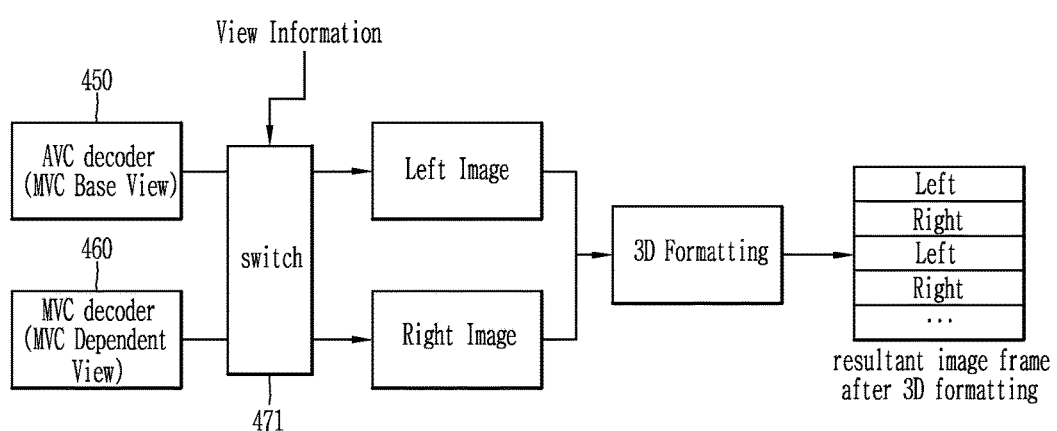
FIG. 11 is a conceptual view illustrating one exemplary embodiment of configurations of a decoder and a formatter using view point information.

FIGS. 10 and 11 are conceptual views respectively illustrating one exemplary embodiment of a structure of a reception apparatus for controlling a 3D output of a decoded picture using view information, and one exemplary embodiment of configurations of decoders and a formatter using view information.

A broadcasting reception apparatus may include a tuner and demodulator 410, a vestigial side band (VSB) decoder 420, a transport packet demultiplexer (TP demux) 430, a PSI/PSIP processor 440, an A/V decoder 450, an extension video decoder 460, and a 3D stereoscopic control and 3D formatter 470 (3D video processor).

Although not illustrated, the broadcasting reception apparatus may include an image output unit for outputting an image of a corresponding view point. The image output unit may be configured to control images corresponding to each view point and display them on a screen, or be provided in plurality to output right and left view images, respectively.

The tuner and demodulator 410 receives and detects a digital broadcasting signal, and correct an error to generate a transport stream. The TP demux 430 is provided as an example of a demultiplexer which executes filtering and parsing the transport stream. The PSI/PSIP processor 440 extracts packet identifier (PID) information related to a video stream from table information forwarded from the TP demux 430.

The A/V decoder 450 is a decoder for decoding a base view video, and the extension video decoder 460 is a decoder for decoding an extended view video. Each of the A/V decoder 450 and the extension video decoder 460 is provided with a video coding layer (VCL) for processing video data, and a header & SEI for processing supplemental data. Also, according to an exemplary embodiment disclosed herein, a view information processor may further be provided.

Hereinafter, an operating method of the thusly-configured reception apparatus will be described.

The reception apparatus extracts a video stream PID from PMT and TVCT information parsed from the PSI/PSIP processor 440, and allows the TP demux 430 to output a video stream using the corresponding video stream PID. If the output video stream corresponds to a base view video (AVC), the TP demux 430 outputs the video stream to the A/V decoder 450. If the output video stream corresponds to an extended view video (MVC extension), the TP demux 430 outputs the video stream to the extension video decoder 460.

The A/V decoder 450 and the extension video decoder 460 respectively process video data and supplemental data, contained in the received video stream, and output those processed data to the 3D video processor 470. Here, the A/V decoder 450 and the extension video decoder 460 process an SEI message included in the supplemental data to output view point information (or view information). In this case, a frame level control is carried out.

The view information processor 480 processes view point information set in the view_information_descriptor using PMT or EIT information parsed from the PSI/PSIP processor 440, and outputs the processed view point information to the 3D video processor 470. In this case, a program or event level control may be carried out.

The 3D video processor 470 controls video data received from the A/V decoder 450 and the extension video decoder 460 using view point information to correspond to each view point, and outputs the controlled data.

Referring to FIG. 11, the 3D video processor 470 is provided with a switch 471 which switches right and left view images according to the view information. FIG. 11 illustrates a case where a display device is a line-interlaced polarization type. As illustrated in FIG. 11, after the right and left view images are set in the switch 471, 3D formatting may be executed. As a result, combination or switching of the right and left view images may be executed in a frame.

As described above, the reception apparatus disclosed herein may recognize view points of images included in the received video stream or recognize whether an image is a left view image or a right view image using a descriptor of PMT or EIT, and execute image switching in unit of channel/program/service/frame.

In order for the reception apparatus to process a 3D video broadcasting signal transmitted through a digital broadcasting signal and output 3D video data on a screen, various functions may be required in addition to the aforementioned switching function. As one example, additional constraints and operations should be correctly guided by considering situations of a transmitting end and a receiving end associated with stream configuration, when desiring to support 3D broadcasting based on a specific coding scheme. Especially, for stereo 3D broadcasting configured by two of right and left view images, broadcasting transmission may be enabled based on an MVC stereo technique which supports coding for two streams, and a method for supporting the type of broadcasting and an operating manner of a reception apparatus using the method should be defined.

In one example, in case of 3D broadcasting based on H.264/AVC scheme, additionally required constraints or regulations may be supplemented to define an MVC stereo codec. Hereinafter, an NAl unit, an access unit, a view component, a base view component, a dependent view component, a sequence parameter set (SPS), and a picture parameter set (PPS) will first be described.

The MVC stereo codec defines a video coding layer (VCL) handling video coding, and a layer called a network abstraction layer (NAL) located between the VCL and a sub system and transmitting and storing coded information. Accordingly, the MVC stereo codec is configured in a separate structure of the VCL and the NAL. The NAL unit includes an NAL header and a raw byte sequence payload (RBSP) generated from the VCL. The MVC (described in Annex H of H.264/AVC spec) coding, similar to H.264/AVC, is executed based on the NAL units. A configuration of nal_unit_type is shown in FIG. 12.

One set which several NAL units are gathered to access information contained within a bit string in a picture unit is referred to as an access unit. The meaning of the access unit in the MVC stereo codec (or an MVC access unit) extends to a combination of a pair of stereo images including base view and dependent view images, which correspond to each other. That is, the base view and the dependent view are paired to configure the access unit.

The view component refers to each of MVC-coded base view and dependent view, and indicates one of a left view image or a right view image. Consequently, two view components corresponding to each other are combined into one access unit.

The base view component is called an AVC video sub-bitstream of MVC (in 2-PID multiplex mode) or an MVC base view sub-bitstream (in 1-PID multiplex mode). The base view component is a component corresponding to a base image of the two MVC-coded view components, and indicates a stream which can be decoded using the conventional AVC/H.264 decoder.

The dependent view component is a stream which can be decoded using Annex H of ISO/IEC 14496-10, and corresponds to an MVC extension stream. The dependent view component is decoded using an inter-view prediction, which uses a decoded result of a base view or an inter-prediction between the dependent view components.

The SPS includes a parameter commonly applied to a video sequence. The SPS includes profile, level, chroma format (information such as 4:2:0), the number of frames included in a sequence, a picture size, frame crop-related information, and the like. That is, the SPS may be header information which includes information related to coding of the entire sequence, such as profile, level and the like.

The PPS contains parameters applied to one or several pictures, and includes an entropy coding mode (CABAC, CABLC, etc.) for picture, the number of slices, slice configuration information, information related to a quantization parameter, and the like. Specifically, the PPS may be header information indicating a coding mode of an entire picture.

Hereinafter, description will be given of the order of transmitting/receiving and processing NAL units in 3D broadcasting based on the MVC stereo coding. The order that the reception apparatus transmits/receives and processes NAL units depends on a multiplex mode configuration. The MVC stereo bitstream may be configured into two multiplex modes. Hereinafter, a case of 2-PID multiplex mode will first be described.

Figure 13:
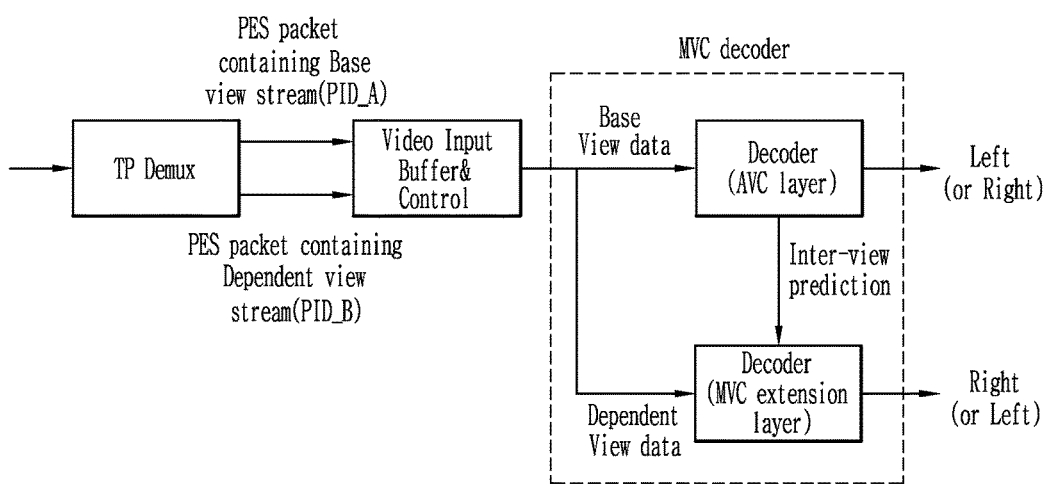
FIG. 13 is a view illustrating a structure of a reception apparatus in MVC stereo broadcasting of a 2-PID mode.

FIG. 13 is a view illustrating a structure of a reception apparatus in an MVC stereo broadcasting of a 2-PID mode.

As illustrated in FIG. 13, in the 2-PID multiplex mode, one PES packet contains one MVC view component, and each stream is processed in a separate decoder. Hereinafter, an operation of a receiver with respect to a 2-PID mode stream will be exemplarily described.

First, the TP demux recognizes PID values of packets, which include a base view and an extended view (or a dependent view), using information included in a PSI/PSIP/SI section, and inputs the corresponding PID packets (PID_A and PID_B) to a video input buffer & control block.

The video input buffer & control block temporarily stores the two independent PID streams, recognizes packets corresponding to the base view and the extended view, which correspond to each other, based on PTS or DTS information contained in the PES packets, and outputs the recognized packets to the MVC decoder. That is, the video input buffer & control block processes slices of the NAL unit.

The video input buffer & control block ensures a sufficient storage space in preparation of a case where the order of the input base view and extended view streams is changed. Also, the video input buffer & control block also manages a synchronization function for always transferring a view pair of two corresponding views at the output toward the MVC decoder.

Next, PES or ES containing the base view and the extended view corresponding to each other is also transferred to the MVC decoder (here, non-VCL information such as SPS, PPS and the like is also included).

The MVC decoder has a function and a configuration for decoding data corresponding to the AVC layer and the MVC extension layer, which then decode the base view data and the extended view data, respectively. Hereinafter, a decoding step performed in the MVC decoder will be described in more detail.

FIG. 14A is a view illustrating one exemplary embodiment of processing a base view stream (PID_A) in an AVC layer, and FIGS. 14B and 14C are views illustrating exemplary embodiments of processing an extended view stream (PID_B) in an MVC extension layer.

Every access unit may include an NAL unit corresponding to a slice of a primary coded picture, and an AU delimiter may be added at the front of the access unit.

Referring to FIG. 14A, for processing NAL units, the AVC layer determines the head of the access unit using the AU delimiter of the first access unit in a group of pictures (GOP, or a sequence), and checks SPS, PPS, and SEI message. As illustrated, a prefix NAL unit or a subset sequence parameter set may further be added. Finally, a base view video is processed in the first access unit. In detail, a primary coded picture and redundant/auxiliary coded pictures of the base view stream are processed in the first access unit.

In the subsequent access units, AU delimiter, PPS, SEI message and the base view video are processed, respectively. The last access unit of the GOP determines an end of the sequence based on an end of sequence (EOS). Also, each NAL unit of the access unit, along with the AU delimiter, complies with the same regulation as H.264/AVC for backward-compatibility with the conventional 2D HDTV.

Referring to FIGS. 14B and 14C, the processing order of the NAL units in the MVC extension layer may be roughly divided into two scenarios. Also, the scenarios may be constraints of the NAL unit processing in the MVC stereo coding.

First, a case of transmitting/processing a type of NAL unit including video data associated with an extended view (or a dependent view) by being set to nal_unit_type=20 (coded slice of non-base view) may be allowed. Here, the access units may be configured as illustrated in FIG. 14B according to where they are located within GOP.

An AU delimiter is a start symbol indicating the head of each access unit, and may be set to nal_unit_type=9. The AU delimiter precedes PPS or SPS. As another example, an AU delimiter for the extended view only may be specified using nal_unit_type=18. Subset sequence parameter set may include information related to SPS MVC extension, for example, extension information related to coding of a profile or level for MVC or the entire sequence. The subset sequence parameter set may be included in the first access unit in the GOP (or sequence).

A PPS indicates a coding mode of the whole picture for an extended view. SEI message may be transmitted by being included in an MVC scalable nesting SEI message. As aforementioned, video data of the extended view is transmitted/processed by being set to the coded slice extension (nal_unit_type=20) in each access unit.

Next, a processing order in case of transmitting/processing video data of an extended view by setting nal_unit_type for NAL units to 1 (non-IDR) or 5 (IDR), and a configuration in such a case is illustrated in FIG. 14C.

Even in this case, the AU delimiter is a start symbol indicating the front of each access unit, and may be set to nal_unit_type=9. As another example, the AU delimiter for an extended view stream only may be specified using nal_unit_type=18.

Video data of the extended view is transmitted/processed by setting nal_unit_type to 1 or 5 in each access unit. In more detail, it is informed whether the NAL unit is either a coded slice of an IDR picture or a coded slice of a non-IDR picture. Therefore, it may be reported in which condition the first picture of GOP is, how the subsequent picture are ordered, or which picture is ordered as the last.

Unlike the foregoing embodiments, in this exemplary embodiment disclosed herein, a prefix NAL unit may further be provided. The prefix NAL unit refers to an NAL unit whose decoding order precedes those of other NAL units. For example, the prefix NAL unit is transmitted/processed as nal_unit_type=14 and decoded earlier than an NAL unit of nal_unit_type=1 or 5. Accordingly, the prefix NAL unit is decoded earlier than the video data of the extended view.

The foregoing description has been given of the case of the 2-PID multiplex mode. Hereinafter, 1-PID multiplex mode will be described.

FIG. 15 is a view illustrating a reception apparatus in an MVC stereo broadcasting of a 1-PID mode.

As illustrated in FIG. 15, in the 1-PID multiplex mode, base view and extended view videos may be included in one stream and processed together in the MVC decoder. Hereinafter, an operation of a receiver with respect to a 1-PID mode stream will be exemplarily described.

First, the TP demux recognizes a PID value (PID_A) of an MVC video stream packet, which includes the base view and the extended view, based on information included in PSI/PSIP/SI section, and inputs the corresponding PID packet to the video input buffer & control block.

The video input buffer & control block temporarily stores one MVC stream, and thereafter outputs the temporarily stored MVC stream to the MVC decoder based on PTS or DTS information included in a PES packet. In this case, the base view and the extended view transmitted by one stream already have pre-aligned orders. Hence, the video input buffer & control block do not have to carry out a synchronization.

The PES or ES is transferred to the MVC decoder in an MVC access unit. Here, non_VCL information such as SPS, PPS and the like may also be included, and the MVC access unit may determine a start point based on an NAL unit including the AU delimiter.

The MVC decoder has a function and a configuration for decoding data corresponding to the AVC layer and the MVC extension layer, which then decode the base view data and the extended view data, respectively. Hereinafter, a configuration of an access unit for performing decoding in the MVC decoder will be described in more detail.

FIG. 16 is a view illustrating a processing order according to each access unit included in GOP in a 1-PID mode.

An AU delimiter is added at the front of every access unit, and indicates a start symbol of a base view. The AU delimiter complies with the same regulation as H.264/AVC for backward-compatibility with the conventional 2D HDTV.

Each access unit is configured in the order of a PPS (base view), a PPS (dependent view), an SEI message (base view), an SEI message (dependent view), a video (base view), a prefix NAL unit (dependent view), and a video (dependent view). Also, the first access unit of GOP is provided with a SPS (base view) and a subset sequence parameter set, and the last access unit is provided with an end of sequence (EOS). The subset sequence parameter set includes information related to an SPS MVC extension (dependent view), and may also be aligned subsequent to a SPS (base view).

The SEI message (dependent view) is included in an MVC scalable nesting SEI message.

The video (base view) is provided with a primary coded picture and redundant/auxiliary coded pictures, and is transferred as a coded slice of an IDR picture.

The prefix NAL unit (dependent view) may be omitted for preventing a mis-operation of the conventional AVC decoder, and presence or absence of the prefix NAL unit may be decided based on a no_prefix_nal_unit_present value of the MVC extension descriptor.

The video (dependent view) may be coded slice MVC extension NAL units. Also, if the prefix NAL unit is present, the type of NAL unit of the video slice constructing the extended view is set to nal_unit_type=1 (non-IDR) or 5 (IDR). If the prefix NAL unit is not present, the video slice constructing the extended view is nal_unit_type=20.

The EOS may be set to nal_unit_type=10.

As can be understood in the configuration, items which should be prescribed for each step upon decoding the MVC stereo NAL unit may include an AU delimiter (base view), an SPS (base view), a PPS (base view), an SEI message (base view), a prefix NAL unit or subset sequence parameter set (base view), a video (base view), an SPS MVC extension (dependent view), a PPS (dependent view), an SEI message (dependent view), a prefix NAL unit or a subset sequence parameter set (dependent view), a video (dependent view), an end of sequence, and the like.

Hereinafter, constraints of each of the items will be described in more detail. The following description will be applied even to the configuration illustrated in FIGS. 14A to 14C, except for a specific part which is unable to be applied to the 2-PID mode.

First, the SPS (base view), the PPS (base view), the SEI message (base view), the prefix NAL unit or the subset sequence parameter set (base view), and the end of sequence comply with the same regulation as H.264/AVC for backward-compatibility with the conventional 2D HDTV.

The compliance of the same regulation as H.264/AVC is equally applied to video (base view), and relationship between the base view and the dependent view conforms to the following conditions.

First, an MVC random access is indicated using a random_access_indicator field within an adaptation field of a transport packet. Here, there is no problem even when this field is located only in the base view component. Therefore, an embodiment in which the corresponding field is included only in a transport packet which includes a start point of the base view component can be implemented.

Elementary_stream_priority_indicator is set to '1' when the MVC stereo base view is an I or IDR picture (a random access is started and an IDR picture is present in a base view), and a value of anchor_pic_flag is set to '1' with respect to an NAL unit including a corresponding dependent view. That is, the anchor_pic_flag of the corresponding NAL unit is set to '1' even in case of all prefix NAL units (nal_unit_type=14), slice extension NAL units (nal_unit_type=20), and the dependent view (nal_unit_type=1 or 5).

With respect to the base view and the dependent view, the first byte of a PES packet payload should be the first byte of a base view (or dependent view) video. In this case, when the reception apparatus processes the PES packet, the reception apparatus is free from a burden of adding separate processing for searching for the first byte of a picture in the payload.

Also, PTS/DTS of the base view component and that of the dependent view component should be the same as each other. When tolerance is present, a difference should be observed only in the lower 9 bits (corresponding to about $\frac{1}{180}$ second, a value which is the closest to the half of $\frac{1}{50}$ second and easy in counter comparison). In this case, the receiver compares and processes upper 24 bits of each PTS/DTS.

When AVC_still_present of the AVC descriptor is set to '1', it is considered that the corresponding condition is applied even to MVC stereo, namely, interpreted and processed as MVC still picture.

pic_width_in_mbs_minus1 and pic_height_in_map_units_minus1 are not changed in the MVC stereo, and take different values from each other in the base view component and the dependent view component. An aspect ratio of an image in the MVC stereo may be 16:9. The aspect ratio should be the same in a base view video and a dependent view video. In this case, when the dependent view component is transmitted from a transmitting end in a down-sampled manner, a horizontal/vertical ratio may be different in view of resolution, but the finally output aspect ratio using the sample aspect ratio may be equally set to 16:9.

Also, color parameter information may be transmitted with respect to each of the base view component and the dependent view component, and each color parameter information may have the same value.

While a 3D event undergoes, profile, level, frame rate, a progressive/interlaced state, entropy_coding_mode_flag and the like all related to a video are fixed, and MVC should be maintained. Also, entropy_coding_mode_flag of PPS should be set to the same value in the base view and the dependent view.

An SPS (base view) is coded in subset sequence parameter set. Here, it should be set to have the same value as SPS MVC extension (dependent view). That is, the SPS field is set in a manner that the base view and the extension view have the same value as each other. In this case, seq_parameter_set_id and profile_idc are excluded.

Since the same data is applied to the base view component and the dependent view component, a method of transmitting only a value of seq_parameter_set_id of the base view having the same parameter value to a position of seq_parameter-set-data( ) within subset_seq_param_set of the dependent view component may be allowed. However, in this case, the MVC decoder may use a structure of sharing, not separately managing, a memory which stores SPS, PPS and the like used by each view component when decoding the base view and the dependent view. That is, the MVC decoder uses a structure of allowing the SPS for the base view to be used in the dependent view.

In a PPS (dependent view), the same entropy_coding_mode is set with respect to the base view and the extension view.

An SEI message (dependent view) may be included in an MVC scalable nesting SEI message. In more detail, all SEI messages applied to the dependent view are included in an MVC_scalable_nesting SEI message and then transmitted. For example, a pan-scan rectangle SEI message may be included in the MVC_scalable_nesting SEI message and then transmitted. In this case, the receiver may decode right and left view images and set display areas, on which those images are displayed, respectively, during a final output process, using the pan-scan rectangle SEI message for each of the images. That is, if the pan-scan rectangle SEI has been set differently for the base view and the dependent view, the base view outputs an area signaled by the pan-scan rectangle SEI of a base view stream, and the dependent view outputs an area signaled by the pan-scan rectangle SEI for the dependent view component. The reception apparatus outputs a stereoscopic video using each selected area.

In this case, a transmission/processing order of the SEI message included in the dependent view may include three steps. For example, the SEI message may be composed of an MVC scalable nesting SEI message including a buffering period SEI message, an MVC scalable nesting SEI message including a user data registered SEI message with OSD depth range metadata, and other MVC scalable SEI messages.

In a prefix NAL unit or subset sequence parameter set (dependent view), when a no_prefix_nal_unit_present field of an MVC_extension_descriptor is set to '1', a prefix NAL unit cannot be present in a dependent view video stream. In this case, an NAL unit including a dependent view video may be set only to nal_unit_type=20. That is, nal_unit_type cannot be set to 1 or 5.

Hereinafter, constraints of video (dependent view) will be described.

First, for an MVC anchor picture, a decoder should normally decode a 3D stereo view pair and display a stereo picture based on the MVC anchor picture.

For an MVC stereo corresponding view component, an allowable primary_pic_type or an allowable slice_type should be set with respect to the base view and the dependent view constructing the MVC picture. Since a slice_type related to inter-view is not separately present, a constraint using I/P/B slice is required to be defined, and may be configured as shown in the following Table 2.

For an MVC stereo RAP, an allowed slice set should be specified. The MVC stereo RAP refers to a start point at which a 3D image can be decoded into a complete format at a random view point, and corresponds to a case of receiving both the base view data and the dependent view data. For example, the base view may merely include an IDR picture or I slice. The dependent view may include only an I slice or P slice. A reference picture may allow only for a base view picture which is present in the same access unit.

In addition to the aforementioned constraints of each item, MVC stereo decoding may provides constraints for RAP configuration of the base view and the dependent view. That is, MVC stereo RAP time interval may be changed, and related broadcast requirements should be set. For example, TP including the MVC stereo RAP or a PES header of an MVC random access view component includes adaptation fields. Here, each field may have the following configuration.

payload_unit_start_indicator='1'
    adaptation_field_control='11'
    random_access_indicator='1'
    elementary_stream_priority_indicator='1' (here, in case of a base view component)

An arrangement interval of the MVC stereo RAP is recommended to have a predetermined period. In this case, upon carrying out a trick play in a 3D mode, a frame skip is enabled at a uniform interval, which may result in a natural trick play.

A prefix NAL unit is not allowed in the MVC stereo base view. This is for maintaining backward-compatibility. Here, the MVC base view is assumed to have the following characteristics.

An IDR or non-IDR is decided according to nal_unit_type of a corresponding base view component (it is set to '0' because it is an IDR picture when nal_unit_type is 5, and set to '1' because it is a non-IDR picture when nal_unit_type is 1).
    A base view is considered as having the highest priority.
    view_id of base view is considered as set to '0'.
    Temporal levels of corresponding base and dependent views are assumed to be the same.
    A value of anchor_pic_flag field is equally set with respect to a base view and a dependent view.
    inter view is carried out.

Also, the MVC stereo base view does not allow a coded slice extension NAL unit (nal_unit_type=20) and a subset sequence parameter set NAL unit (nal_unit_type=15).

TABLE 2

| | Allowed parameter value for base view component | | Allowed parameter value for dependent view component | |
|---|---|---|---|---|
| | primary_pic_type | slice_type | primary_pic_type | slice_type |
| Stereo I picture (MVC I picture) | 0 | 2, 7 | 0 | 2, 7 |
| Stereo P picture (MVC P picture) | 0, 1 | 0, 2, 5, 7 | 0, 1 | 0, 2, 5, 7 |
| Stereo B picture (MVC B picture) | 0, 1, 2 | 0, 1, 2, 5, 6, 7 | 0, 1, 2 | 0, 1, 2, 5, 6, 7 |

Here, regarding the stereo P picture, a primary_pic_type of each of the base view and the dependent view should not be set to 0 simultaneously. In addition, regarding the stereo B picture, at least one of the base view and the dependent view should have the value of the primary_pic_type set to 2.

As another constraint, each GOP structure of the base view video stream and the dependent view video stream should be the same. In addition, the base view video stream and the dependent view video stream should also be the same in a GOP structure, a view count, a value of nal_ref_idc in a corresponding slice, a display order (picture order count), a decoding delay defined by subtracting DTS from PTS of a first picture of GOP, and the like.

Figure 17:
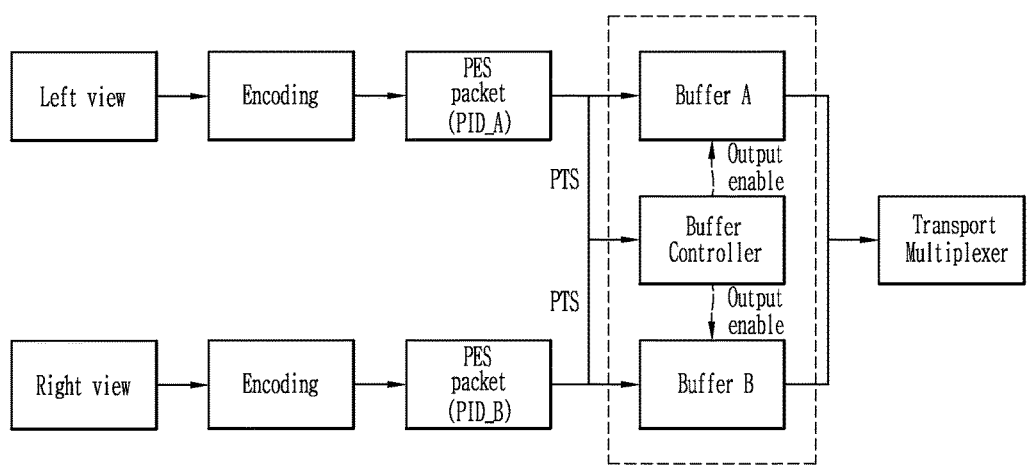
FIG. 17 is a view illustrating a data processing process of a transmission apparatus for transmitting 3D broadcasting in a 2-PID mode.

Hereinafter, a transport (TS) packet multiplexing guideline in a 2-PID mode will be described with reference to FIG. 17. FIG. 17 is a view illustrating a data processing process of a transmission apparatus for transmitting 3D broadcasting in a 2-PID mode.

As illustrated in FIG. 17, in the 2-PID multiplex mode, one PES packet includes one MVC view component, and each stream (or streams of right and left view images) is processed in a separate encoder. One of a base view and a dependent view may be a left view image and the other may be a right view image. In this case, PID values (PID_A, PID_B) of packets including the base view and the dependent view are provided, respectively, and the PID values are output to different buffers (buffer A, buffer B) according to the corresponding PID packets.

In this case, a first TS packet of a PES packet header of an MVC stereo base view component corresponding to a first access unit in a GOP should precede a first TS packet of a PES packet header of an MVC stereo dependent view component corresponding to a base view for a first dependent unit in the GOP. Also, the last TS packet of the PES packet header having the MVC stereo dependent view component of the last dependent unit in the GOP should precede the first TS packet of the PES packet header having the MVC stereo base view component of the first access unit in the subsequent GOP.

In this case, during an encoding and remixing process, PES packets which include the corresponding base view and dependent view are arranged in a sequential manner by referring to a PTS of each view component. To this end, a block which simultaneously manages buffers for two of the base view and dependent view streams may be disposed at the front of a multiplexer. For example, the block may include a buffer controller in addition to the buffer A and the buffer B. The buffer controller may synchronize the PES packets with each other by referring to each PTS.

In such a manner, the foregoing description has defined the operations of the transmission apparatus as well as the allowable operations of the reception apparatus, which are allowable in executing the MVC stereo-based 3D broadcasting, and has proposed the method of using them. Hereinafter, description will be given of an overall configuration of a reception apparatus for receiving and outputting MVC stereo-based 3D broadcasting.

Figure 18:
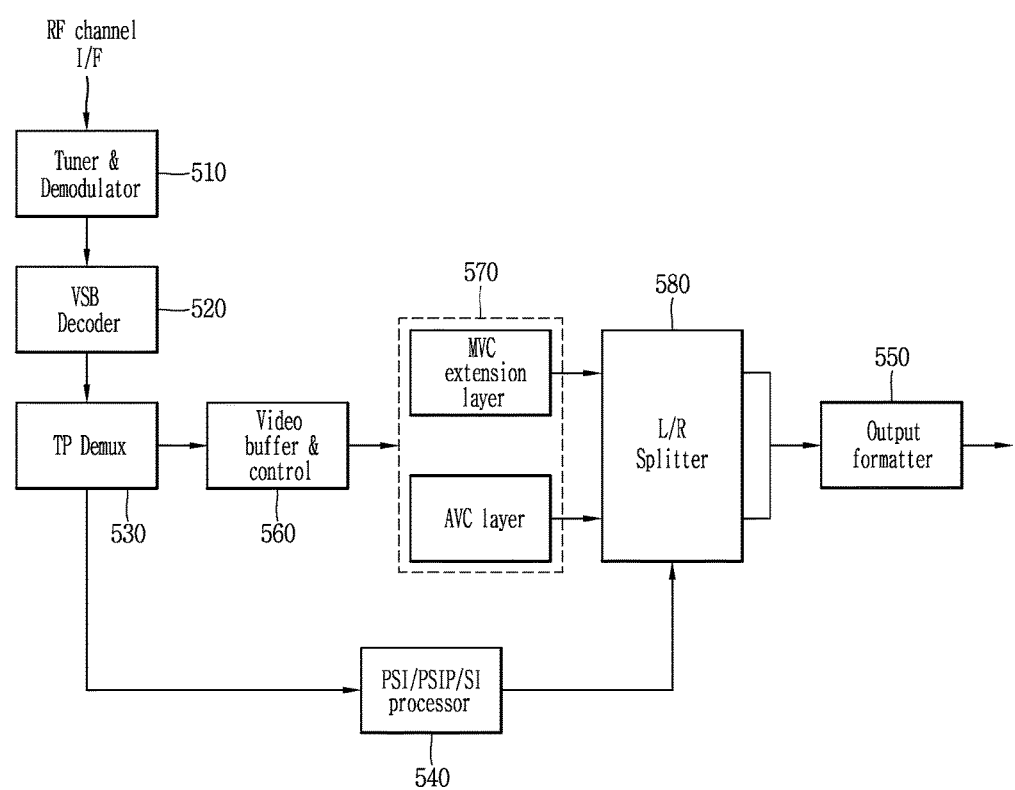
FIG. 18 is a view illustrating a structure of a reception apparatus for receiving and outputting 3D broadcasting.

FIG. 18 is a view illustrating a structure of a reception apparatus for receiving and outputting 3D broadcasting.

A broadcasting reception apparatus may include a tuner and demodulator 510, a VSB decoder 520, a TP demux 530, a PSI/PSIP processor 540, and an output formatter 550.

Although not illustrated, the broadcasting reception apparatus may include an image output unit for outputting an image of a corresponding view point. The image output unit may be configured to control images corresponding to each view point and display them on a screen, or be provided in plurality to output right and left view images, respectively.

The tuner and demodulator 510 receives and detects a digital broadcasting signal, and corrects an error to generate a transport stream. The TP demux 530 is provided as an exemplary demultiplexer which executes filtering and parsing the transport stream. The PSI/PSIP processor 540 extracts packet identifier (PID) information related to a video stream from table information forwarded from the TP demux 530. The TP demux 530 recognizes PID values of packets, which include a base view and a dependent view, using information included in a PSI/PSIP/SI section, and inputs the corresponding PID packets to a video buffer & control block 560.

The video buffer & control block 560 temporarily stores the two independent PID streams, recognizes packets corresponding to the base view and the dependent view which correspond to each other, and outputs the recognized packets to a decoder 570. Here, an AVC layer is a decoder for decoding a base view video, and an MVC extension layer is a decoder for decoding a dependent view video.

Based on information extracted by the PSI/PSIP processor 540, the output formatter 550 formats the base view video stream and the extension view video stream, to correspond to an output of the image output unit, and then transmits the formatted streams.

Here, in order to format the base view video stream and the extension view video stream to correspond to a stereoscopic output, an L/R splitter 580 is disposed at the front of the output formatter 550. The L/R splitter 580 matches the base view video stream and the extension view video stream as a left view image and a right view images, respectively, using view point position information (specifically, information as to whether or not it is a left image or a right image) extracted by the PSI/PSIP processor 540.

The thusly-configured reception apparatus may check and process stereoscopic image information, so as to allow for outputting the stereoscopic image.

So far, various embodiments have been illustrated to describe the unique scope associated with various aspects of the present disclosure. However, one or more detailed features given in one specific embodiment may also be applied to one or more other embodiments. Some components or steps illustrated in each embodiment and related drawings may be modified and additional components and/or steps may be deleted, moved or included.

Various features and ideas described herein may be practiced by software, hardware, firmware, middleware, or a combination thereof. For example, a computer program (executed by a computer, a processor, a controller and the like), which is stored in a computer-executable medium to implement a method of receiving a stereoscopic image signal and a reception apparatus for the stereoscopic image signal in digital broadcasting may include at least one program code section executing various tasks. Similarly, a software tool (executed by a computer, a processor, a controller and the like), which is stored in a computer-executable medium to implement a method of receiving stereoscopic image signal and a reception apparatus for the stereoscopic image signal in digital broadcasting may include a part of program codes executing various tasks.

The invention claimed is:

1. A digital broadcasting receiving method, comprising:
receiving and demultiplexing a digital broadcasting signal including a base view video stream and a dependent view video stream;
determining right/left information related to the base view video stream and the dependent view video stream, using a descriptor provided in at least one of a program map table (PMT), a terrestrial virtual channel table (TVCT), a service description table (SDT), and an event information table (EIT);
decoding the base view video stream and the dependent view video stream; and
controlling the decoded base view video stream and dependent view video stream using the right/left information, wherein the descriptor indicates the right/left information related to the base view video stream and the dependent view video stream, wherein the descriptor further indicates whether the right/left information is changed in at least one of a program level, an event level and a frame level, and wherein a supplemental enhancement information (SEI) message having accurate right/left information is included in the corresponding stream if the right/left information is changed in at least one of the program level, the event level and the frame level.

2. The method of claim 1, wherein the base view video stream and the dependent view video stream are provided with video stream sections of different view points from each other.

3. The method of claim 2, wherein whether each of the base view video stream and the dependent view video stream is a right view image or a left view image is switched in the video stream sections of different view points.

4. The method of claim 1, wherein the right/left information on the program level, the event level and the frame level is processed according to set priorities.

5. The method of claim 1, wherein the base view video stream and the dependent view video stream are provided with the video stream sections of different view points, and the view point information indicates the view points of the video stream sections using at least one of a frame unit, a picture unit and sequence unit.

6. The method of claim 5, wherein the descriptor further comprises a field indicating whether or not the SEI message is included.

7. The method of claim 6, wherein the descriptor is preferentially processed if the content included in the descriptor and contents included in the SEI message are different from each other.

8. The method of claim 1, wherein the SEI message comprises a field informing whether a picture including the SEI message is a left view image or a right view image, and a field informing to which view point of multi-view video codec streams the picture is applied.

9. A digital broadcasting reception apparatus comprising:
a tuner receiving a digital broadcasting signal including a base view video stream and a dependent view video stream;
a demultiplexer demultiplexing the base view video stream and the dependent view video stream from the digital broadcasting signal;
a processor determining right/left information related to the base view video stream and the dependent view video stream, using a descriptor included in at least one of a program map table (PMT), a terrestrial virtual channel table (TVCT), a service description table (SDT), and an event information table (EIT);
a decoder decoding the base view video stream and the dependent view video stream; and
a 3D video processor controlling the decoded base view video stream and dependent view video stream using right/left information,
wherein the descriptor indicates the right/left information related to the base view video stream and the dependent view video stream,
wherein the descriptor further indicates whether the right/left information is changed in at least one of a program level, an event level and a frame level, and
wherein a supplemental enhancement information (SEI) message having accurate right/left information is included in the corresponding stream if the right/left information is changed in at least one of the program level, the event level and the frame level.

10. The apparatus of claim 9, wherein the base view video stream and the dependent view video stream are provided with video stream sections of different view points from each other.

* * * * *